Jan. 6, 1931. J. B. WANTZ 1,788,178
CASSETTE HOLDER
Filed April 4, 1925 2 Sheets-Sheet 1
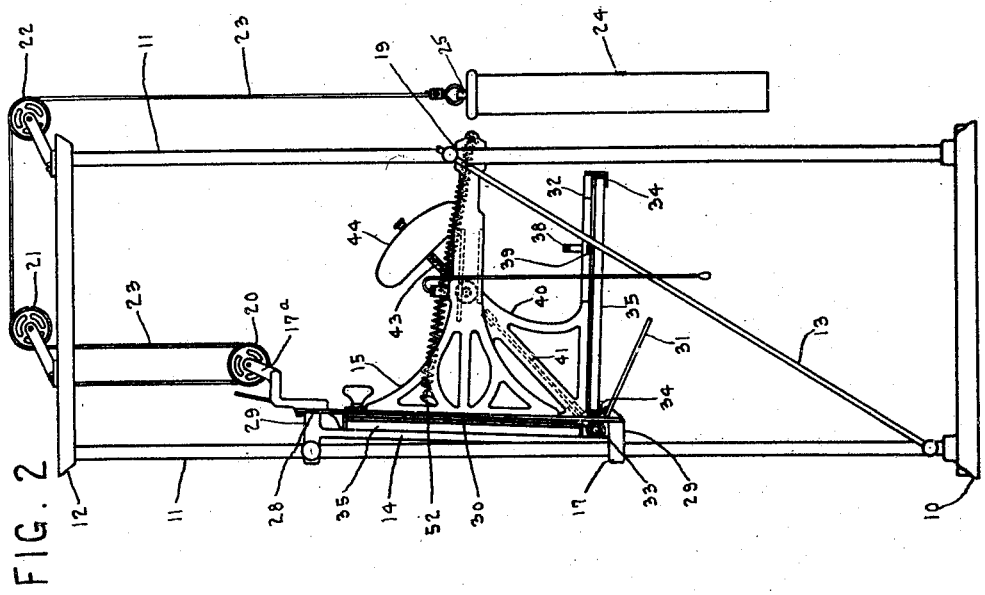
INVENTOR
JULIUS B. WANTZ
BY
ATTORNEY Jan. 6, 1931. J. B. WANTZ 1,788,178
CASSETTE HOLDER
Filed April 4, 1925 2 Sheets-Sheet 2

INVENTOR
JULIUS B. WANTZ
BY
ATTORNEY

Patented Jan. 6, 1931

1,788,178

UNITED STATES PATENT OFFICE

JULIUS B. WANTZ, OF OAK PARK, ILLINOIS, ASSIGNOR TO GENERAL ELECTRIC X-RAY CORPORATION, OF CHICAGO, ILLINOIS, A CORPORATION OF NEW YORK

CASSETTE HOLDER

Application filed April 4, 1925. Serial No. 20,855.

The present invention relates to apparatus for the production of stereo-roentgenograms, and has to do with film or plate holding and shifting means.

In the X-ray art, numerous so called "plate changers" have been devised, some of which have worked with more or less success, but none has been highly efficient. Although films are almost universally used in X-ray photography, the term plate shifter persists in the art.

Among the objects of the present invention, therefore, are the provision of

A novel holder adapted to receive and retain cassettes at an angle to one another;

A unique holder comprising means for retaining cassettes at an angle to one another and adapted to function by moving one of said cassettes into substantially the same position as that previously occupied by the other cassette;

An improved type of holder adapted to move about a shifting pivot whereby cassettes disposed at an angle to one another may successively be brought under the influence of the same X-ray tube;

A combination of cassettes disposed at an angle to one another and in a stand providing a shifting means for said cassettes;

A combination of a multiple cassette holder with a stand including means for changing the position of the cassette holder as an incident to movement in said stand about a shifting pivot;

A combination of a pivoted cassette holder and a stand, the movement of such holder being controlled by a counterbalance;

A shifter mechanism including a multiple cassette holder so arranged that such holder is adapted to be moved about a shiftable pivot under the influence of an actuating member, the movement of said holder being governed by a counterbalance;

A unique cassette changer adjustably carried by a stand and possessing a counterbalance, the shifting movements of the changer being controlled by the adjustment of such counterbalance;

A novel combination of a changeable cassette holder, a stand therefor, a counterbalance for said holder, actuating means for said holder, and brake means for limiting the movements of said holder.

In the device which is here illustrated, the employment of a counterbalance permits shifting the position of the cassettes with a total elimination of jar or vibration. Such change in the position of the cassettes is accomplished with a total absence of noise, and the apparatus operates so smoothly that the subject being photographed is not disturbed.

Incidentally, the device permits of the production of stereo-radiographs with the patient in either a standing or a sitting position, such photography being selective, rapid, and adapted to be duplicated with consistency.

Among the commercial advantages which the invention possesses is simplicity in manipulation, its profound convenience for both operator and patient, its aptitude for operation from either side, and its adapatability to conform to any room arrangement. In addition to this, the device is rigid and compact, and all of the parts thereof are readily accessible.

The objects hereinabove recited, and such objects as may hereinafter appear, are obtained by the novel combination of parts, their unique construction, and their arrangement with respect one to another. A single embodiment of the invention is fully illustrated, and the drawing of such embodiment is hereby made a part of this application.

In the drawing:

Figure 1 is a front elevation of the single embodiment of the invention illustrated.

Figure 2 is a side elevation thereof.

Figure 6 is an elevation of a stop member and handle device usable with the device.

Like reference characters are used to designate similar parts in the drawing and in the description which follows.

Figure 4:
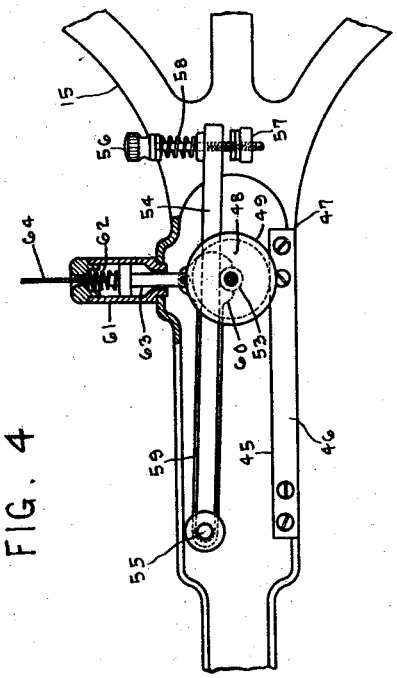
Figure 4 is a vertical detail of one of the tracks for the horizontally shiftable pivot and of the brake and latch used therewith.

An X-ray tube adapted to be used in conjunction with the apparatus is not shown. It is presumed that such an X-ray tube will be properly mounted for changing its position in connection with making a second exposure for stereo-roentgenograms, stands for accomplishing this change being conventional in the X-ray art.

Reference should first be had to Figure 1. In this figure and in Figures 2 and 3 parts of the stand are broken away to save space.

Upon a base plate 10, ordinarily a casting having sides and a cross bar and shaped somewhat in the form of a letter H, four uprights 11 are disposed. Uprights 11 are of the same length and are secured at their top by an integral member 12, generally a hollow rectangular casting. The front and sides of the casting for the top 12 may be inwardly bent as shown. Any symmetrical configuration for said top 12 is suitable.

Two of the uprights 11 may be spoken of hereinafter as either the front pair, the rear pair, or a side pair, as may be proper in the particular instance. At the sides of the device, each pair of uprights 11 is joined by an obliquely disposed rod used for reinforcing the frame, which comprises bottom 10, uprights 11, top 12, and reinforcing rods 13. The latter, of course, may be omitted.

A carriage 14 is provided for the cassette holders and said carriage is mounted for reciprocation upon the frame. Said carriage 14 comprises side members 15 somewhat T-shaped and generally castings. Each of the side members 15 is secured at the front of the device to a substantially square frame member 16 also ordinarily a casting. While both side members 15 and the member 16 as shown are castings, they may be manufactured by any other suitable process.

At each corner of the frame 16, are sleeves or bearings 17, surrounding or substantially surrounding the uprights 11. Set screws 18 may be placed in one or more of said sleeves 17. At the rear end of said side members 15 a single bearing 19, generally bifurcated, is in engagement with the rear uprights 11. Free movement of carriage 14 upon the uprights 11 is thus obtained when set screws 18 are released.

Upon a bracket 17a placed midway between the upper bearings 17 in the front 16 of carriage 14 is a pulley 20. A pulley 21 is affixed to the front of the top 12 at the middle thereof and a pulley 22 is disposed on the rear cross bar or section of said top 12.

A cable 23 or cord is anchored in the middle of said front section of top 12, passed downwardly about the pulley 20 therebeneath, upwardly over pulley 21 above, and rearwardly over pulley 22. A weight 24 having an eye 25 in the top section thereof is provided to balance the weight of carriage 14, and the parts carried thereby. The cord 23, after passing over the pulleys 20, 21 and 22, is secured to said eye 25, by suitable fastening means. Movement up and down, of the carriage 14 causes a movement of weight 24 in an opposite direction.

The purpose of providing the weight 24 is to secure easy shifting of the carriage carrying plate or film holders by counterbalancing it upon the frame and to maintain said carriage 14 in any predetermined position. Set screws 18, however, are provided in frame 16 so that any fixed position determined by adjustment of the carriage 14 may be positively maintained without danger of accidental displacement of said carriage 14 as an incident to motion imparted to the shiftable sections thereof.

The substantially square aperture in the front of frame 16 is closed by a veneer panel 26 which is supplied with crossed lines 27 to assist in adjusting the subject and in focusing and positioning the X-ray tube. At each side, said frame 16 carries a substantially upright bar 28 disposed upon and suitably fastened to lugs 29 adjacent the top and bottom of said front 16 to form a track 30, the purpose of which will later appear. Wings 31 at the top and bottom of frame 16 comprising sheet metallic material are angularly disposed thereupon to prevent the possibility of secondary radiation from the frame 16 fogging films in the cassettes. The wing 31 at the top prevents the subject from seeing the moving parts and the wing 31 at the bottom prevents the subject's knees from being struck by the moving members.

The cassette holders carried upon carriage 14 comprise two members 32 disposed at substantially right angles to one another and joined one to another. At or near the point of intersection of members 32, a pin or lug 33 projects outwardly into track 30. Cassette holders 32 are joined in any suitable manner, may be disposed at an angle other than 90°, and ordinarily comprise frames of case metal having flanged ends 34 adapted to enclose the ends of a cassette 35 whereby to provide a slide mounting for such cassette. Two cassettes 35 are plainly visible in Figure 2. Any suitable means may be employed for holding the cassettes 35 upon the holders 32, such means being adapted to prevent lateral displacement.

Usually stop members 37 which may be removed from one side of holders 32 and placed upon the other side thereof are employed. In this manner, the device may be adapted for loading from either side. To facilitate discharge of the lower cassette 35, a stop member 37 having a finger 36 to engage cassette 35 and a handle 38 is mounted upon said lower cassette holder 32, and is held thereon by bifurcated inwardly projecting members 39. The stop member 37 may be reversed by first removing the handle 38. The discharge of cassette 35 thus may be had at either side of the apparatus.

Brace members or angle pieces 40 are secured at each side of the cassette holders 32, primarily for the purpose of maintaining said cassette holders 32 rigidly in a position at substantially a 90° angle to one another, (or at any other selected angle) secondarily, to support a metallic sheet 41 equidistantly disposed between the cassette holders 32 and providing a screen therebetween impenetrable by X-rays, and tertiarily, to support a cross bar 42. The presence of sheet 41 avoids the possibility of X-rays penetrating one film while the other is being exposed and thus fogging the film.

Cross bar 42 has projecting ends which provide the pivot of movement for the cassette holders 32 as shifting thereof occurs. Depending from the bar 42 at about its center is a threaded standard 43 disposed at an angle which bisects the angle at which the cassette holders 32 are disposed, or, in other words, standard 43 is in a line exactly therebetween. Upon standard 43 is threaded a weight 44. Movement inwardly or outwardly of said weight 44 along the stem 43 determines, conjointly with the influence of an actuating force for the cassette holders 32, shortly to be explained, the rapidity or speed with which the cassette holders 32 are shifted from the position shown in Figure 2 to that disclosed in Figure 3.

Upon each of the side members 15 is a track 45 comprising a rail 46 secured to lugs 47 in said side members. A roller bearing 48 having an internal flange 49 is mounted for free rotation upon cross bar 42 adjacent its end. Rail 46 supports a portion of the weight of cassette holders 32 and provides a path for the movement of cross bar 42 during the shifting of said holders 32 from the position disclosed in Figure 2 to that illustrated in Figure 3.

The supporting means upon carriage 14 for cassette holders 32 therefore move upon rail 46 (track 45) and track 30. Movement in the latter is vertical and upon the former horizontal.

Anchored upon the rear extremities of the side members 15 or upon a cross bar 50 which may be employed to unite them are two spiral springs 51 having their other end secured to arms 52 fastened to the upper cassette holder 32 at a point above the center of said cassette holder. When the springs 51 are properly adjusted, and the counterbalance 44 is properly disposed upon the stem 43, force is required to cause the multiple cassette holders 32 to move into the position shown in Figure 2.

In order to secure the cassette holders 32 in the position disclosed and for the additional purpose of providing brake means, a latch and an adjustable brake member are provided. These operate at the end of cross bar 42 beyond roller bearing 48. A second roller bearing 53 is placed at each of the extreme ends of cross bar 42.

Engaging bearing 53 from above is a brake bar 54 pivoted upon a lug or axle 55 above and at the rear end of track 45. At the front, said brake bar 54 is slotted and reciprocates freely upon a vertical screw 56 threaded into a lug 57. Between the head of screw 56 and bar 54 is a spiral spring 58 surrounding screw 56 and urging bar 54 downwardly. Adjustment of screw 56 determines the breaking force of bar 54, such braking force being effective in a decreasing degree as the cassette holders 32 are released from the latched position shown in Figure 2 and in increasing degree as the position shown in Figure 3 for said cassette holders 32 is approached.

Pivoted upon lug 55 is a latch member 59 which has a hook end 60. In the hook end 60 which has a straight rear face, the bar 42 is adapted to be seated when moved to its foremost position. A release 61 for latch 59 is disposed upon side member 15 and comprises a barrel having a spring 62 therein, a link 63 secured to latch 59, and a string or cord 64 extending outwardly to be grasped by the operator. The spring 62 causes latch 59 to fall when cord 64 is released. Pull upon the cord 64 pulls latch 59 out of engagement with bar 42, and under the actuation of springs 51, the cassette holder moves from the position shown in Figure 2 to that illustrated in Figure 3. In either of such positions the cassettes 35 are immediately behind and in parallel relation to front 26 of frame 16.

Figure 3:
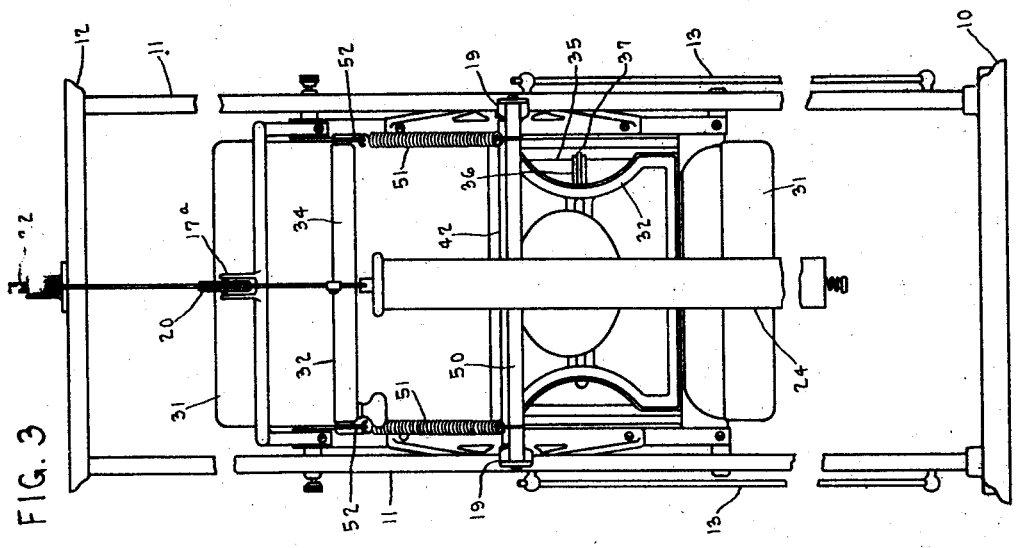
Figure 3 is a rear view thereof, the cassette holder being in a position different from that illustrated in Figure 2.

By adjustment of counterweight 44 and brake bar 54, the velocity of the cassette holders 32 during shifting may be varied to suit specific conditions. The position disclosed in Figure 3 is the proper position for loading and removing cassettes 35. When loaded, the latch 59 is released. Said latch 59 is operative in either of the two positions of the cassette holders 32 disclosed. The cassette holders 32, when released, are manually moved into the position shown in Figure 2, such movement being against the resistence of springs 51. Latch 59 holds the position manually obtained.

The film in the upper cassette 35 is exposed first. Latch 59 is then released. The lower cassette 35 assumes a position ready for exposure. Exposure thereof, is had. The exposed films are next removed by sliding cassettes 35 from holders 32. The device is then reloaded and the operations repeated.

Figure 5:
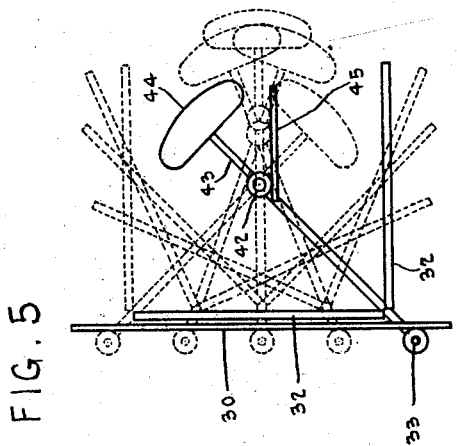
Figure 5 is a diagrammatic representation of the travel of the cassette holder as it changes from the position shown in Figure 2 to the position disclosed in Figure 3.

In Figure 4, the details of the track and braking mechanism associated therewith just described are disclosed. From Figure 5, it is quite manifest that in the shifting operation of the plate holders, the bar 42 moves backwardly upon the track 45 upon a pulling impulse from springs 51. Concurrently the lugs 33 move upwardly in track 30. When the lugs 33 have travelled one-half of the distance of their travel in said track 30, the pivot or cross bar 42 will be at its extreme rear position. From the point just described, the pivot 42 moves forwardly as the lugs 33 move upwardly and the holders 32 approach the position shown in Figure 3.

It is quite possible that an excess of momentum may be obtained by an improper adjustment of the weight 44, or by the use of too great tension upon the springs 51. In order to correct this, the brake members 54 should first be carefully adjusted in connection with the weight. Just enough momentum should be imparted to the casette holders 32 to carry them from one extreme position to the other extreme position. Once so adjusted, slight movement in or out of weight 44 will be sufficient to secure any desired change in the speed of plate shifting without disturbing the position of the brake bar 54.

The apparatus described is adapted to be used for photographic plates, films, or paper. Recently most excellent results have been secured by employing sensitized paper. In the appended claims, therefore, the term plate is used as an all-inclusive term, meaning photographic plates, films and/or paper, or any other medium affected by light whereby to produce photographic impressions.

A unique feature of the device is the counterbalancing of the multiple cassette holders 32. The path of travel of said cassette holders 32 is generally arcuate, the arc not being true because of the necessity for said plate holders 32 to approach close to the panel 26 whereby to provide a photographing position for the plate or film carried by said plate holders.

About midway of the path of travel, the plate holders 32 are in a balanced position, and it is this balanced position which the holders 32 assume when not latched. Movement against the pull of springs 51 to "set" position causes the cassette holders 32 to assume an unbalanced position with the counterbalance 44 above the counterpoised position just described. Release of the latch 59 allows the counterbalance 44 to fall, and the springs 51 give to the plate holders 32 additional impetus so that the lower holder 32 will attain its operable position, in which position the weight 44 occupies a situation below the counterbalanced position just described. The path of movement of the cassette holders 32 and of the weight 44 upon each side of such balanced position to the two operable positions for said plate holders is about equal in the device disclosed but this movement may be altered to suit circumstances.

"Counterpoise" as used in the claims hereinafter relates to a device having the characteristics of a weight disposed upon a wheel or upon a beam and adapted to move about a pivot and in a direction opposite to that of the member for which it serves as a counterpoise, while "counterbalance" is employed therein to designate a weight member suspended from a cord and adapted to provide a balance for a part having linear or reciprocal movement.

I claim :—

1. A stereoscopic plate changer comprising a stand, a counterpoised holder having angularly disposed plate receiving sections and held in said stand in unbalanced position for radiographic exposure, a latch for maintaining said holder in such unbalanced position and means for moving said holder from said position to another position in said stand.

2. A stereoscopic plate changer comprising a stand, a counterpoised holder having a plurality of angularly disposed plate receiving sections, means for securing said holder in a plurality of positions one of which is unstable and another stable, and means for changing said holder from the unstable position to the stable position.

3. A device for facilitating stereoscopic exposures comprising a stand having horizontal and vertical guides, a shiftable cassette holding member maintaining cassettes at a fixed angle to one another and having members seated upon said guides, a standard upon said cassette holding member, a weight adjustably disposed upon said standard, means for actuating said cassette holding member, means adapted to lock said cassette holding member when a cassette contained therein is in a position for radiographic exposure, and a brake member to arrest the speed at which said cassette holding member is shifted.

4. A stereoscopic plate changer comprising a stand, a pivoted holder having a plurality of angularly disposed plate receiving sections, a counterpoise upon said holder, a latch for securing said holder in an unbalanced position for the exposure of a plate contained in one section thereof, and means for urging said holder into a second position for the exposure of a plate contained in a second section thereof, said latch being adapted to secure said holder in said second position.

5. In a stereoscopic plate changer, a pivoted support, an angular plate holder mounted thereon for movement in a plurality of positions, means for urging said holder from one of said positions to another, latching means for latching said holder in both positions, a beam intermediate the angular sections of said plate holder, and a counterpoise on said beam.

JULIUS B. WANTZ.